(No Model.) 4 Sheets—Sheet 1.
W. T. EADES & T. MATTHEWS.
LOAD SUSTAINER FOR WEIGHT LIFTERS.
No. 602,312. Patented Apr. 12, 1898.
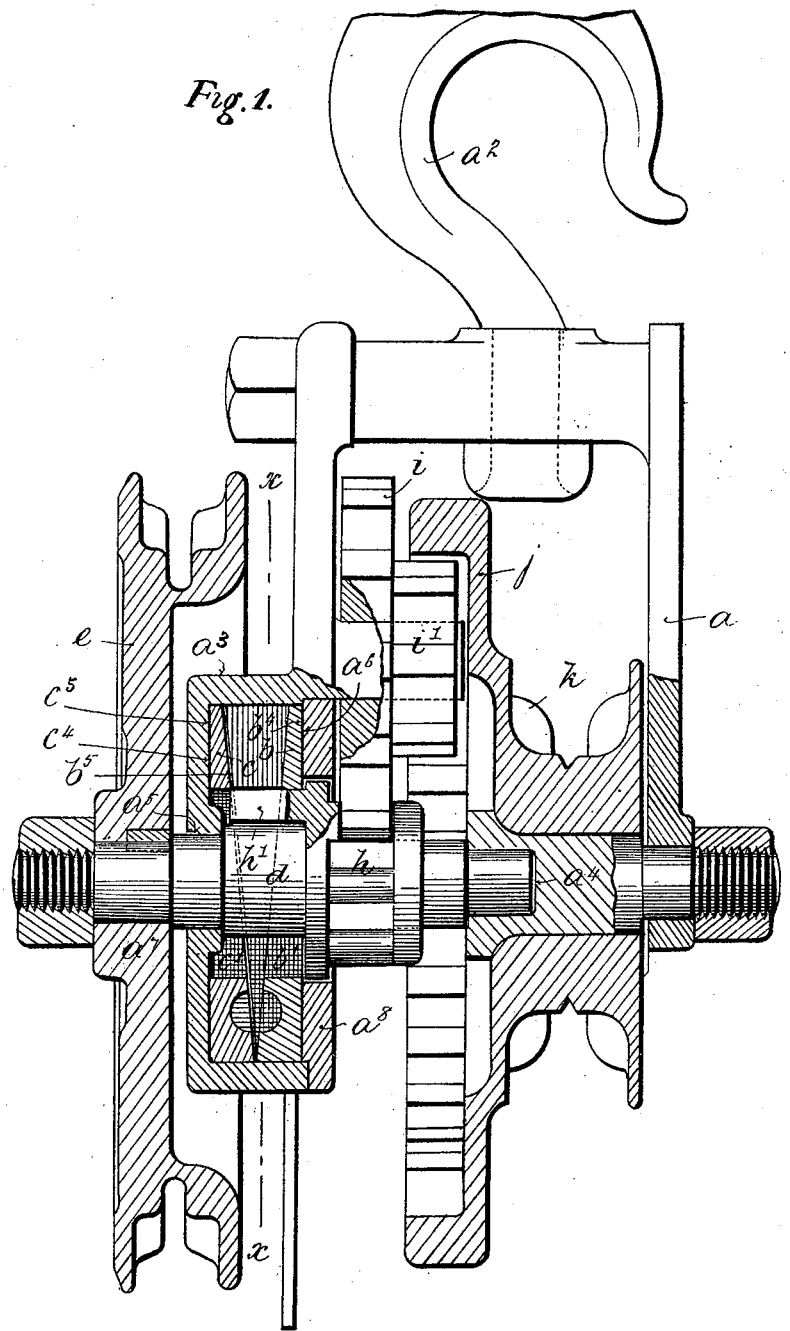
WITNESSES
INVENTORS
William S. Eades
Thomas Matthews
BY James L. Norris
ATTY

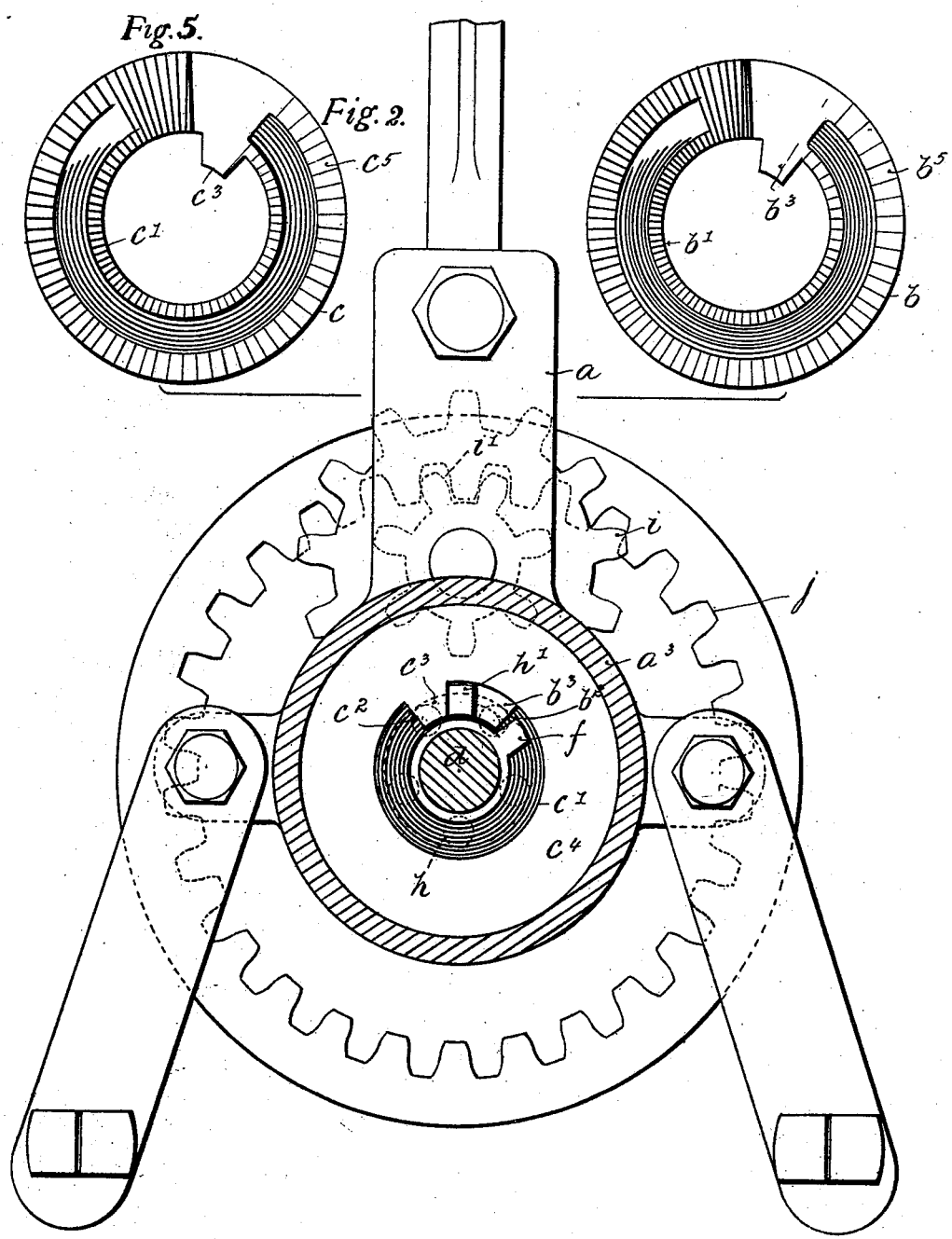

(No Model.)
4 Sheets—Sheet 3.
W. T. EADES & T. MATTHEWS.
LOAD SUSTAINER FOR WEIGHT LIFTERS.
No. 602,312. Patented Apr. 12, 1898.
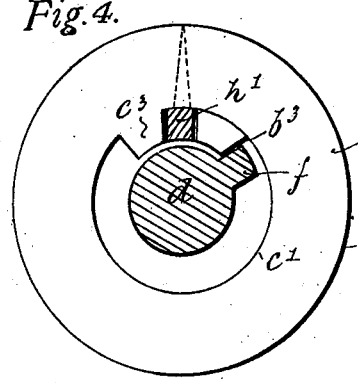
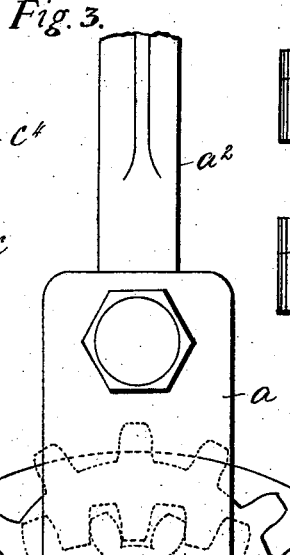
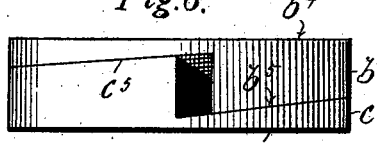
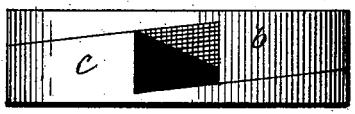
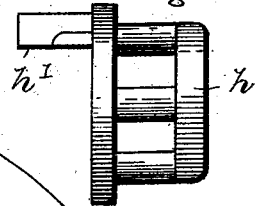
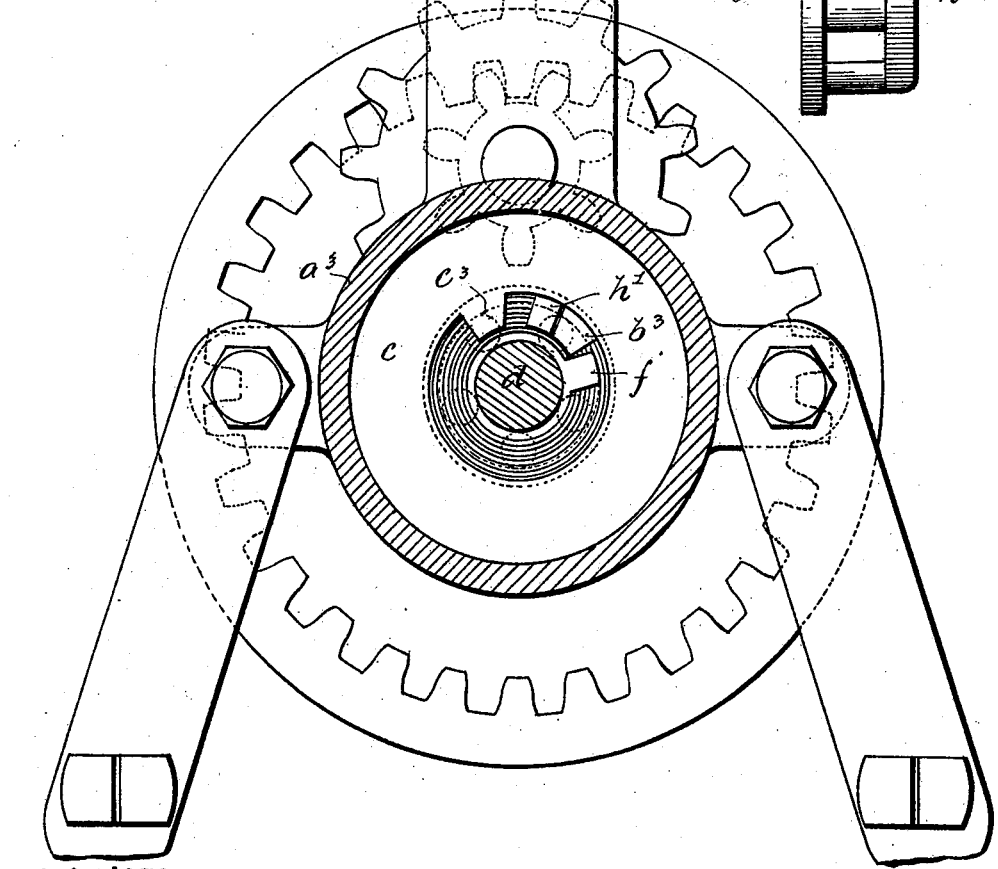
WITNESSES
INVENTORS

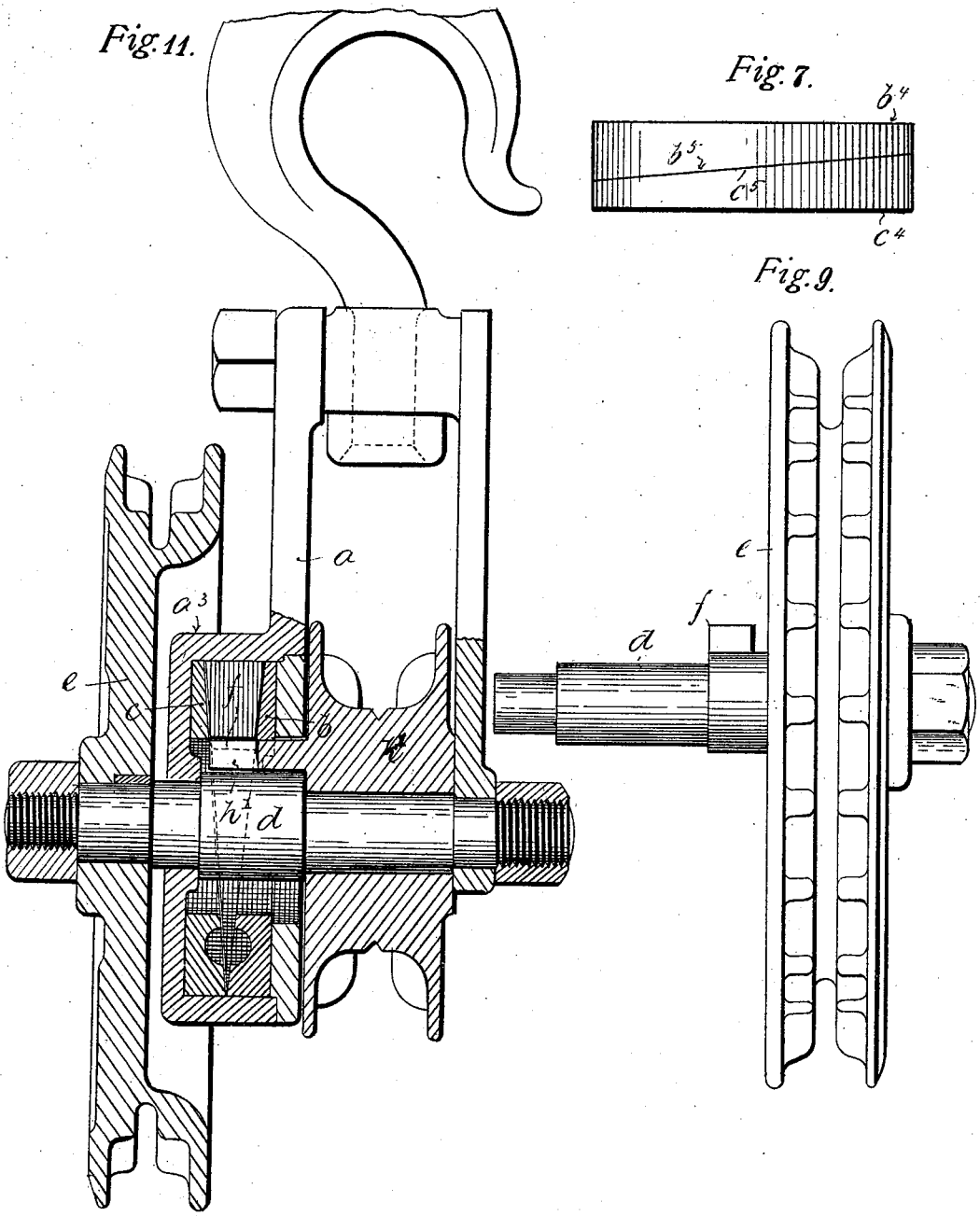

United States Patent Office.

WILLIAM THOMAS EADES, OF BIRMINGHAM, AND THOMAS MATTHEWS, OF LEAMINGTON, ENGLAND.

LOAD-SUSTAINER FOR WEIGHT-LIFTERS.

SPECIFICATION forming part of Letters Patent No. 602,312, dated April 12, 1898.

Application filed October 11, 1897. Serial No. 654,872. (No model.) Patented in England March 8, 1897, No. 6,032, July 31, 1897, No. 17,948, and September 16, 1897, No. 21,233.

*To all whom it may concern:*

Be it known that I, WILLIAM THOMAS EADES, engineer, residing at 40 Floodgate street, in the city of Birmingham, and THOMAS MATTHEWS, coal merchant, residing at 47 Warwick street, Leamington, in the county of Warwick, England, subjects of the Queen of Great Britain, have invented certain new and useful Improvements in Load-Sustainers for Weight-Lifters, of which the following is a specification, and for which said invention three several Letters Patent have been obtained in Great Britain, dated, respectively, March 8, 1897, No. 6,032, July 31, 1897, No. 17,948, and September 16, 1897, No. 21,233.

This invention relates to load-sustaining means for pulley-blocks, hoists, lifts, crabs, cranes, capstans, winches, windlasses, and like mechanical appliances for raising, lifting, and otherwise dealing with heavy weights or bodies, and has for its object an automatic load-sustainer.

According to our improvements a considerable mechanical advantage is obtained over pulley-blocks and the like of the ordinary construction, inasmuch as we are enabled to transmit the necessary power for raising a load with a great reduction of friction, and hence a corresponding reduction in the amount of power required to raise a given weight.

Figure 1 of the accompanying drawings represents in vertical section a double-lift pulley-block fitted or provided with an automatic brake or load-sustainer constructed and arranged according to our invention, and adapted, when lifting or lowering force is not being transmitted to the hand-wheel, to be automatically put into operation for checking the descent or falling movement of the load through the force exerted by the weight of the said load upon the load-wheel, and to be released or taken off on again rotating the driving or hand wheel in one or other direction. Fig. 2 is a vertical section of Fig. 1 upon the dotted line $x$, showing the parts in the positions they assume when the brake is off or out of action, leaving the axle free to revolve in either the one direction or the other for raising or lowering a weight. Fig. 3 is a like section of the block as Fig. 2, but with the parts of the brake shown in their acting positions for arresting or checking the running down of the load, the said brake or clutch being taken into operation by the pull exerted by the said load upon the load-wheel. Fig. 4 is a side elevation of the disks of the clutch or brake mechanism separately, but with the parts of the pulley which put them into and out of braking contact with their opposed friction-plates and also carry them around bodily with the axle when out of braking contact indicated in the positions they respectively assume when the brake is idle. Fig. 5 represents inside elevations of the opposed helical-formed faces of the disk-segments of the clutch or brake. Fig. 6 is a top side edge view of the said sections of the clutch, and Fig. 7 is an under side edge view of the same, both the said views showing the clutch in its normal out-of-action position, while Fig. 8 represents a like view as Fig. 6, but with the brake-clutch expanded to take its outer parallel faces into frictional contact with the opposed sides of the box or chamber wherein said brake is located. Fig. 9 represents the hand-wheel and main axle of the block separately, showing the driving-stud. Fig. 10 represents the pinion loosely mounted on the axle of the gearing separately, showing the stud or projection on the end of the same which comes between the lugs of the clutch-segments and is actuated by the pull of the load to separate the said segments for putting on the brake. Fig. 11 is a vertical sectional view of a modification.

The same letters of reference indicate corresponding parts in the several figures of the drawings.

In the double-lift pulley-block shown in said Figs. 1 to 10, $a$ is the framing of the apparatus, which is supported by the swiveling hook $a^2$ and is provided with a chamber or box $a^3$, wherein is located a pair of cam or incline faced circular friction plates or disks $b$ $c$, having central holes or middle apertures $b'$ $c'$, wherethrough the main axis or shaft $d$, which is mounted in bearings $a^4$ $a^5$, passes, the one end of the same being provided with a hand or sprocket wheel $e$, made fast thereon, while the said shaft also carries a fixed arm or stud $f$, adapted to come at the back edge $b^2$ $c^2$ of one or other of the pair of lugs $b^3$ $c^3$, respectively carried at the inner peripheries of the two incline or helical faced friction-plates $b$ $c$ and adapted to close them to-together or to contract them to their normal breadth, so as to take their outer and parallel faces $b^4$ $c^4$ out of braking contact with the opposed faces $a^6$ of the walls or sides of the box-chamber $a^3$, which is preferably made in two parts $a^7$ $a^8$, the outer one $a^7$ being integral with the framing $a$, while the inner wall $a^8$ is made as a separate plate, clamped against the open end of the part $a^7$ by nuts and bolts or equivalent connections.

Running loose upon the shaft is a pinion $h$, which may intergear with another wheel $i$, formed with a pinion $i'$, which drives the toothed annulus or internal gear $j$, carrying the load-wheel $k$, said pinions and wheels being mounted on suitable bearings in the fixed frame.

The pinion or wheel $h$, loose on the axis, has a snug or arm $h'$ directed from it, coming between the lugs or projections $b^3$ $c^3$, directed inwardly from the peripheries of the central openings $b'$ $c'$ in the friction-plates of the clutch, brake, or load-sustainer, and is adapted, on the transmission of driving power to the hand-wheel being ceased, to separate the said lugs, so as to cause the opposed helical faces $b^5$ $c^5$ of the disks or friction-plates to rotate upon or wipe over and run up the incline of one another, and thus increase the normal combined thickness of the friction-plates or the distance between their outer parallel faces, which are thereby expanded into frictional and braking contact with the walls or sides of the chamber, so that the back or check action of the load thus comes into play for putting on the brake, which by jamming the gearing of the block arrests the running down of the load and holds the same stationary until such time that further driving power is applied to the hand-wheel and through its axle to the stud $f$, which bears upon the outer edge of one or other of the studs $b^3$ $c^3$, when the friction-plates revolve upon one another in the reverse direction for a short distance and their outer faces are returned to the normal distance apart, thus taking off the brake and admitting of the same being carried around bodily, with the axle on the load being now further raised or lowered.

Instead of the stud for putting on the check or brake being carried by the pinion it may be carried by an intermediate wheel, or where no reduction or intermediate gear is employed then the check stud or arm may be carried upon the load-wheel. Fig. 11 represents this last-mentioned modification, $a$ being the framing of the pulley, $d$ the axle, with hand-wheel $e$ fast on its end, and $f$ is the driving-stud thereon, coming against one or other of the lugs $b^3$ $c^3$ of the friction-blocks or clutch-segments $b$ $c$, located in the casing $a^3$, while $k'$ is the load-wheel, loosely mounted on the opposite end of the said axle and having a stud $h'$, coming between said lugs $b^3$ $c^3$ and operating to separate the same for expanding the normal width of the segments $b$ and $c$ and putting on the brake.

It is understood that the driving-stud $f$ instead of being carried on the axle may be mounted directly upon the hand-wheel, and, further, that the load-pinion will set up the jamming action in whichever direction it moves, and that the hand-wheel will release in either direction, so as to give a double sustaining motion, and that the loose pinion may be made to engage with any form of epicycloidal or other modifying gear other than the particular arrangement herein described, and represented in the drawings.

The application of our invention to load-sustainers for single-lift pulley-blocks and to hoists, lifts, crabs, cranes, capstans, winches, windlasses, and like mechanical appliances for dealing with heavy weights differs in no essential respect from its application to double-lift pulley-blocks as herein described.

Having fully described our invention, what we desire to claim and secure by Letters Patent is—

1. In an automatic brake for hoisting mechanism, the combination with the load-wheel, of a shaft arranged in the same axial line with said wheel and having fixed thereon a hand-wheel, a fixed box-casing arranged between the hand-wheel and load-wheel, two friction-disks loosely arranged about said shaft within said box, said disks having inclined adjacent faces and provided with inwardly-projecting lugs, a stud projecting between the lugs and arranged to revolve with the load-wheel, said stud operating when the load-wheel is revolved to separate the lugs and rotate the friction-disks one upon the other and thus force them into frictional contact with the inclosing box, and a stud arranged to be thrown into engagement with either of the said lugs to rotate the friction-disks one upon the other in the opposite direction and withdraw them out of contact with the box, substantially as described.

2. In an automatic brake for hoisting mechanism, the combination with the load-wheel, of a shaft arranged in the same axial line with said wheel and having fixed thereon a hand-wheel, a fixed box or casing arranged between the hand-wheel and load-wheel, two friction-disks arranged loosely about the shaft within said box and having inclined adjacent faces, each of said disks being provided with an inwardly-projecting lug, a stud projecting between said lugs and arranged to revolve with the load-wheel, said stud operating to separate the lugs and turn the friction-disks one upon the other and thus force them into frictional contact with the inclosing box, and a stud projecting from the shaft and arranged to engage either of the said lugs when the hand-wheel is turned to turn the friction-disks in the opposite direction and withdraw them out of contact with the box, substantially as described.

3. In an automatic brake for hoisting mechanism, the combination with the load-wheel, of a shaft arranged in the same axial line therewith and having fixed thereon a hand-wheel, a fixed box or casing arranged between the hand-wheel and load-wheel, two centrally-apertured friction-disks arranged about the shaft within the box and having inclined adjacent faces, said friction-disks normally rotating together and each provided with an inwardly-projecting lug, a pinion loosely journaled on the shaft and provided with a stud projecting between the said lugs, intermediate gearing driven by the load-wheel for driving said pinion, and a stud projecting from said shaft and arranged to engage either of said lugs by turning the hand-wheel, substantially as described and for the purpose specified.

In testimony whereof we have hereunto set our hands in presence of two subscribing witnesses.

WILLIAM THOMAS EADES.
THOMAS MATTHEWS.

Witnesses:
WILLIAM H. LONG,
HENRY SKERRETT.